United States Patent

[11] 3,601,601

| [72] | Inventor | Stanley D. Eilenberger |
| | | Middletown, Conn. |
| [21] | Appl. No. | 844,592 |
| [22] | Filed | July 24, 1969 |
| [45] | Patented | Aug. 24, 1971 |
| [73] | Assignee | Progressive Products Corporation |
| | | Kensington, Conn. |

[54] BATTERY ENCASED IN A FUNCTIONAL UNIT
23 Claims, 16 Drawing Figs.

[52] U.S. Cl. .................................................. 240/10.61
[51] Int. Cl. ............................................................ F21l 7/00
[50] Field of Search .......................................... 136/175,
100, 115; 240/10.62, 10.64, 10.65, 10.66, 10.67,
10.68, 10.69, 10.61, 10

[56] References Cited
UNITED STATES PATENTS

| 1,200,366 | 10/1916 | Kerlin | 240/10.65 |
| 2,794,904 | 6/1957 | Salauze | 136/115 X |
| 3,320,922 | 5/1967 | Taylor et al. | 116/118 |

*Primary Examiner*—Donald O. Woodiel
*Attorney*—Russell and Nields

ABSTRACT: A disposable electric device, such as a flashlight, which includes a casing having one or more battery compartments; an electrode overlay, such as zinc, on one or more compartment surface; another electrode overlay, such as carbon, on another surface; a serial or parallel electric connection between the compartments; a battery mix; operative electrical elements of the device, such as a bulb and lens assembly, in connection with the electrodes; and sealing means for the device.

INVENTOR.
STANLEY D. EILENBERGER
BY Russell & Nields
ATTORNEYS

PATENTED AUG24 1971
3,601,601
SHEET 2 OF 3
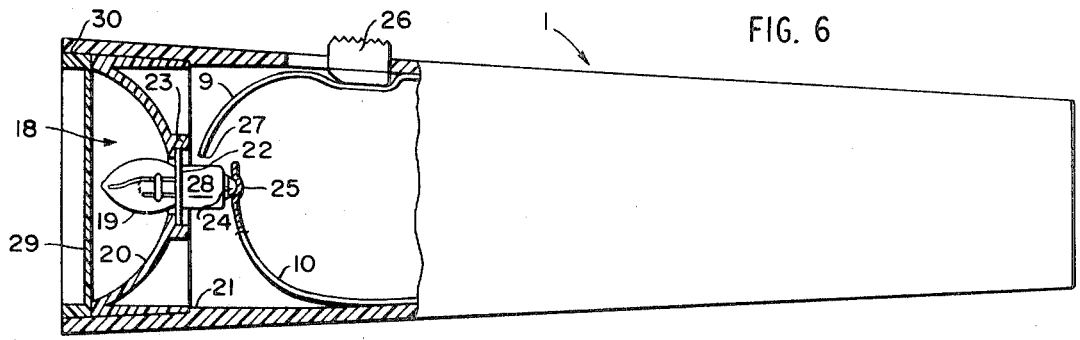
FIG. 6
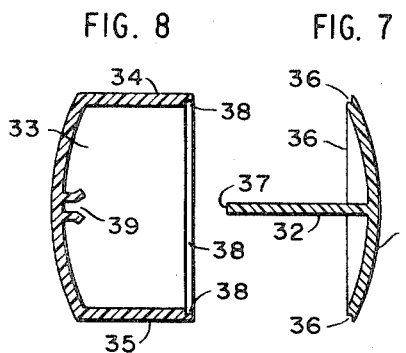
FIG. 8  FIG. 7
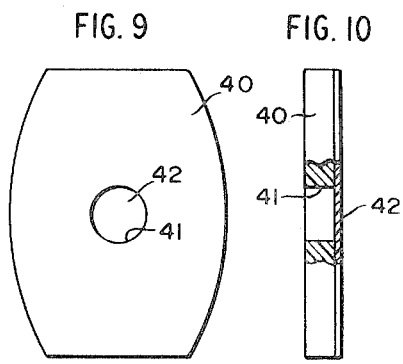
FIG. 9  FIG. 10
FIG. 11
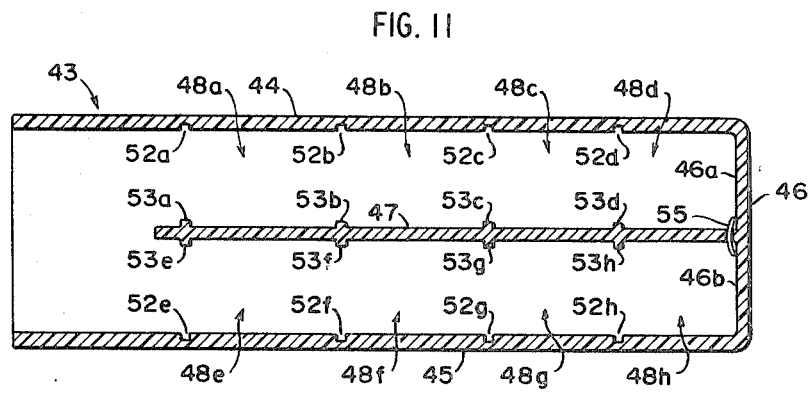
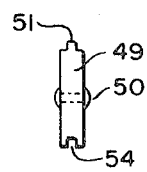
FIG. 12
INVENTOR
STANLEY D. EILENBERGER
BY Russell and Nields
ATTORNEYS

PATENTED AUG 24 1971 3,601,601

INVENTOR
STANLEY D. EILENBERGER
BY Russell & Nields
ATTORNEYS

BATTERY ENCASED IN A FUNCTIONAL UNIT

BACKGROUND OF THE DISCLOSURE

This invention relates to electrical devices, such as a disposable flashlight, which contain a battery encased by the casing of the functional unit.

Numerous attempts have been made to manufacture electrical devices having a battery encased by the device casing itself. The general aim has been to obtain a disposable unit with a long battery life, by utilizing the unit casing to enclose the battery mix in order to maximize the amount of mix which can be encased. See for example U.S. Pat. Nos. 2,561,532; 2,494,265; and 2,794,904. Such devices, however, apparently have not realized widespread commercial success. Recently a disposable flashlight battery has achieved commercial success, but this is of the design illustrated in expired U.S. Pat. No. 2,401,349, wherein two battery cells of ordinary design are encased in a plastic container having the customary bulb and wiring. Indeed, this device is hardly more than a conventional flashlight, having a plastic case, that becomes permanently useless as soon as the batteries expire.

The present invention results in a electrical device having a very high yield of battery mix per unit volume, and which is truly disposable in the sense that the total cost of the unit is competitive with the cost of ordinary cell batteries capable of delivering similar electrical output. The low total cost is due in part to the present method, which is readily adapted to high-speed automated procedures.

It is therefore the major objective of the invention to provide electrical devices in which a battery mix is encased within the device in a high yield per unit volume. Other objectives, as well as advantages, of the invention will become apparent as the invention is further described below.

DESCRIPTION OF THE DRAWINGS

The invention is illustrated in the attached drawings, which show embodiments of the invention as flashlight devices and which serve to illustrate the present devices. These drawings include:

FIG. 6, a side elevation view, partly in cross section, of the case after the contacts have been given their final shape and the lamp and lens assembly have been attached;

FIG. 7 and 8, cross-sectional views in end elevation showing an alternative case arrangement in two pieces with interlocking means;

FIG. 9 and 10, partly in cross section, elevation views, of an alternative sealing means;

FIG. 11, a cross-sectional view showing in elevation another alternative case arrangement having eight separate battery compartments;

FIG. 12, a side view in elevation of a separator element having conductive means between opposite walls, eight of which are used in the case arrangement of FIG. 11;

DETAILED DESCRIPTION

Figure 1:
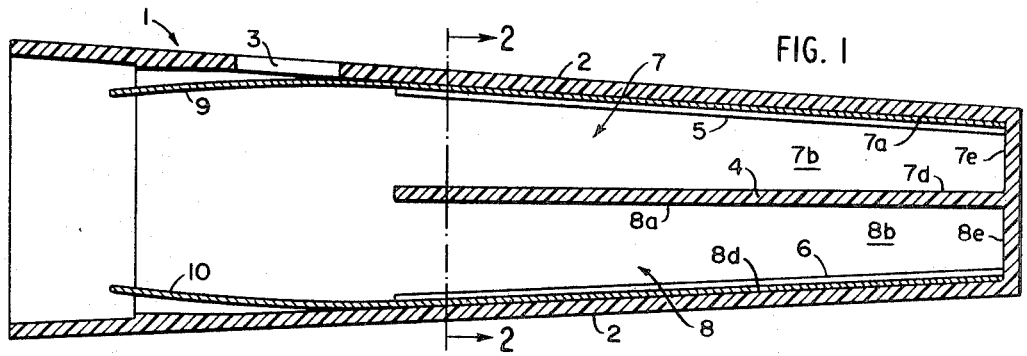
FIG. 1, a cross-sectional view in side elevation of a flashlight case having two compartments, with two contacts in place.

The present invention includes novel disposable electric devices which are at once simple and efficient. In brief, the invention involves incorporating in a certain way battery mix and operative electrical elements in a casing, the structure of which will of course vary depending upon the ultimate use of the functional unit. The invention is particularly illustrated for the preparation of disposable flashlights, but it will be clear that it may be employed as well for other, similar devices, such as night lights, "candle" sticks, bicycle lights or horns, cigarette lighters, desk calendars, alarms, and the like.

The devices of this invention are preferably made by following steps: (1) providing a casing for electrodes, battery mix and the operative electrical elements of the device, preferably composed of a strong, inert plastic material, and containing at least one battery compartment; (2) inserting two electrical contacts into the casing to provide conductive means from the battery compartment(s) to the electrical elements; (3) coating partly or completely at least one wall of each battery compartment with an electrode (e.g. zinc) overlay and providing electrical contact between an overlay and at least one of the electrical contacts; (4) coating partly or completely at least one other wall of each battery compartment with another electrode (e.g. carbon) overlay and providing electrical contact between that overlay and one of the electrical contacts; (5) preferably, coating substantially completely the former (zinc) overlay(s) of each compartment with a paper barrier; (6) filling the battery compartment(s) with a battery mix; (7) sealing the battery compartment(s); (8) and attaching and electrically connecting the operative electrical elements to the two electrical contacts.

The particular order in which all of the above steps are performed is not critical, but it is preferred that steps (1), (3), (4), (5), (6) and (7) are performed at least in part in that order. Step (2) can be performed whenever it is convenient to insert the contacts in conductive relationship with the compartment(s). Further, in order to ensure good electrical contact, it may be preferable to coat two or more walls of each compartment with a zinc overlay and at the same time to provide electrical contact between both electrical contacts and two different zinc overlays, and then to coat one zinc overlay of each compartment with a carbon overlay. This procedure is illustrated in the drawings and will be described fully below. In addition, where a plurality of battery compartments is to be used. It is of course necessary to provide electrical contact between the zinc overlay of one compartment and the carbon overlay of the next. Various ways of simply achieving such contact are described hereafter.

The casings for the present electrical devices are preferably made of a strong, inert plastic. The material should be strong enough to withstand the impact of normal usage, which inevitably would result in dropping from heights up to several feet, without breaking or otherwise leaking the battery mix. And it must be chemically resistant to the battery mix, i.e., noncorroding or inert. Of course, the casing should not be electrically conductive to the extent of defeating its purpose. Several well-known plastics have suitable properties; among them are medium- or high-impact polystyrene, phenolics, vinyls, polyamides, polycarbonates and similar plastics. The casings may be fabricated by any suitable technique, many of which are well known, such as compression or injection molding.

If the electrodes are to be applied by spraying, it ordinarily is necessary to treat the casing surface, for example by sand blasting, to render it capable of adhering with the sprayed electrode film. Finally, if the case is originally in two pieces, or more, they must be sealed to prevent leakage, preferably by ultrasonic sealing. Case sealing is most conveniently performed after the electrode overlays are applied, and may be done before the battery mix is added and the battery compartments are sealed. If ultrasonic sealing is employed, the edges must be clean, which would be achieved also by sand blasting. One of the advantages of the present method is its speed, which in ordinary operation is sufficient to ensure that the casing, after the original sand blasting, remains clean until sealing. The electrode overlays are formed from suitable electrode materials. A preferred anode material is zinc, which may be applied by any suitable method, such as spraying, coating or otherwise applying the electrode layer. The term overlay, as used here, is not intended to limit the method of application, for example, to spraying, although this method is a preferred component of the invention. The overlay may be applied to the battery compartment surface(s) even as a preformed layer, provided that in use it is in intimate contact with the surface(s).

A zinc overlay preferably is 99.9 percent pure, and should preferably be free of iron, tin, arsenic, antimony, magnesium copper and other detrimental impurities. Because of the nature of this invention, impurities which affect only the mechanical properties of zinc, such as lead or cadmium, may be tolerated, but those which adversely affect electrical properties, in particular iron and copper, should be avoided. A zinc overlay may be applied by flame spraying, which is preferred, arc spraying, sputtering or plasma spraying, methods which are generally known to those of the art, as well as by electrodeposition and vacuum metallizing. Flame spraying is a preferred method in part because it results in a high surface area for the zinc, which is advantageous. Since, unlike ordinary battery cells, the zinc is not used for mechanical strength, the zinc overlay need only be thick enough to provide good potential and a complete reaction when the battery is exhausted, although for practical reasons some excess is usually desired. An overlay thickness of about 0.009 inch is adequate, and a thickness in the range of about 0.003—0.02 is normally suitable.

The cathode ordinarily used in conjunction with zinc anodes is, of course, carbon. A carbon overlay may be applied by any of several suitable methods. In this invention the carbon overlay preferably is applied from what has become to be known to the art as an electrically conductive carbon dispersion, a dispersion of fine carbon particles in a suitable vehicle, e.g. alcohol or trichloroethylene. Preferably, a carbon overlay is applied as a pressure spray, sometimes referred to as "airless," in a thickness of about 0.002—0.005 inch, or more. Since a carbon overlay, especially in this thickness range, is a poor electrical conductor, it is preferred to apply a zinc overlay beneath the carbon electrode, so that conductivity is needed only through the carbon overlay thickness, and not along its length. If this is done, however, it is important that the carbon layer on top of the zinc be continuous, with no discontinuities, in order that contact between the battery mix and the zinc sublayer be avoided.

A preferred method of ensuring a continuous carbon layer on a zinc sublayer is to apply the carbon with a resin binder, although this approach may make difficult spray application. Alternatively, the carbon may be applied as a continuous, preformed film on a substrate of carbon on a vinyl sheet to form a duplex electrode.

As will be apparent from the description hereafter, the zinc and carbon overlays are applied to one or more walls of the battery compartments, but not to all of the wall surfaces. Hence, it is necessary while applying the overlays by any of the spraying methods to mask those walls not to be covered, preferably with a material to which the overlay will not adhere, such as, for example for zinc, glass or chrome-plated steel.

There is no intention to limit this invention to the electrode overlays here described in detail, i.e. zinc and carbon. Equivalent electrode materials, such as magnesium or nickel-cadmium, may also be used, with suitable modification to the battery mix composition and method of overlay application, these modifications being within the ordinary skill of the art.

It is desirable to interpose a barrier between the zinc electrodes and the battery mix, to prevent chemical reaction between the mix and the zinc. This barrier may be a gel of cereal paste, such as a mixture of cornstarch and flour which may be directly applied to the zinc anode by spraying or other means, or a gelcoated paper. Alternately, this paste may be prepared from such materials as locust bean flour or guar flour. The purpose of this gel is to provide a thin film between the electrolyte and the zinc anode. Paper coated with cereal paste, usually about 0.005 inch thick is preferred. When wetted by the electrolyte the coating becomes conductive for electric current but prevents chemical action between the ammonium chloride and the zinc. The barrier should be continuous and sealed at the edges, if contact between the zinc and mix is to be avoided.

The composition of the battery mix is not critical, many different suitable compositions being well known; some are described in the literature and some are trade secrets of others. A typical composition would contain about 55—65 percent manganese dioxide, 5—25 percent graphite or acetylene black, 8—15 percent ammonium chloride, 0.5—4 percent zinc chloride, and 10—15 percent water. Equivalent ingredients may, of course, be substituted for the ingredients of the above composition, and equivalent compositions are also known and may be used.

Inhibitors to reduce gassing, such as mercuric chloride or potassium dichromate, may be added to the battery mix. Mercuric chloride is preferred unless the device is to be used at elevated temperature, and may be added in a concentration of up to 0.1 percent, or even more. Since the mercuric chloride forms an amalgam with zinc, thereby weakening the metal, ordinarily it is used only in small amounts, usually about 0.025 percent. Here, however, such restriction is not so critical, since the zinc is not needed for mechanical strength.

Figure 2:
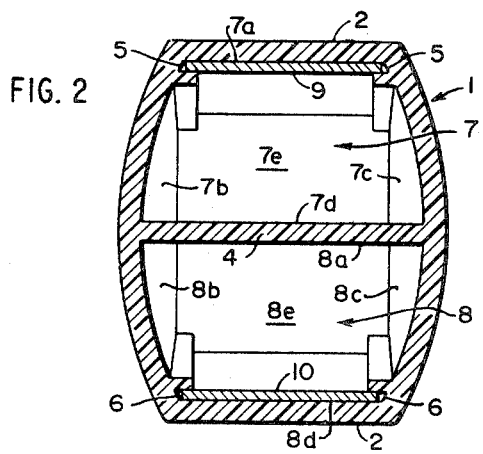
FIG. 2, a cross-sectional view along lines 2-2 of FIG. 1.

With reference to the drawings, FIGS. 1 and 2 show a flashlight casing 1, composed of a strong, inert plastic material, having outer walls 2, a cutout 3, designed to receive a switch button not shown, a center diving wall 4, and recessed tracks 5 and 6. The casing walls define two battery compartments 7 and 8, having wall surfaces 7a—e and 8a—e. Inserted into recessed tracks 5 and 6, respectively, are preformed electrical contacts 9 and 10.

Figure 3:
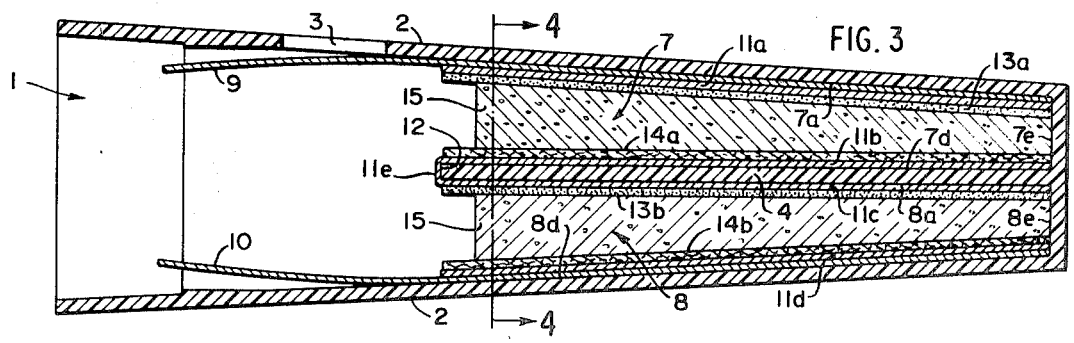
FIG. 3, a cross-sectional view in side elevation of the case after a zinc electrode overlay and a further electrode overlay of carbon have been applied to certain surfaces, after a paper layer has been applied to the exposed zinc surfaces, and after battery mix has been added.
Figure 4:
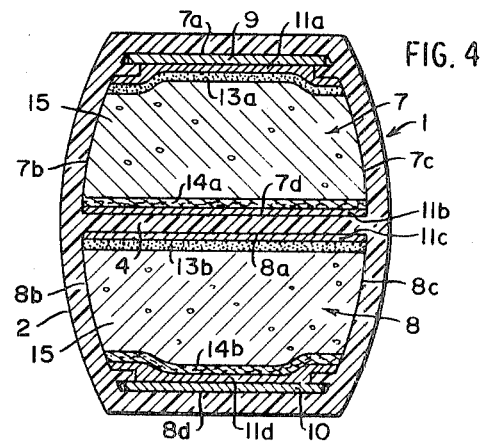
FIG. 4, a cross-sectional view along lines 4-4 of FIG. 3.

FIGS 3 and 4 show the device after several further steps have been performed, as follows. The first step is the application of zinc overlays 11a—e, by a method such as flame spraying, to contacts 9 and 10, wall surfaces 7d and 8a, and to front end surface 12 of center wall 4. The purpose of this last zinc overlay 11e is to provide electrical contact between battery compartments 7 and 8. Zinc overlays 11a and 11c ultimately are to be the anodes of the two battery cells to be provided in compartments 7 and 8, while overlay 11b is to provide contact between overlay 11e and a cathode, and overlay 11d is to provide contact between contact 10 and another cathode. While the zinc overlay is being applied, walls 7b, c, e, and 8b, c, e, are masked, in order to restrict application to the desired areas.

The next step, shown in FIGS 3 and 4, is the application of carbon overlays 13a—b, by spraying, for example, on zinc overlays 11a and 11c, respectively. These carbon overlays provide the cathodes for the two battery cells. While the carbon overlay is being applied, walls 7b, c, e and 8b, c, e, as well as zinc overlays 11b and d, are masked, in order to restrict application to the desired areas, zinc overlays 11a and c.

Figure 5:
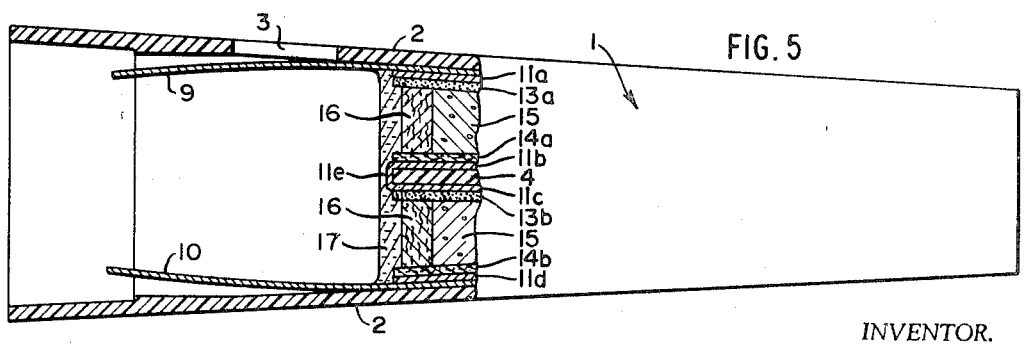
FIG. 5, a side elevation view, partly in cross section, of the case after paper washers and an end seal of wax have been put in place.

The next steps, shown in FIGS 3 and 4, are the application of paper barriers 14a—b on the remaining exposed zinc overlays 11b and 11d of the battery compartments; and the addition of battery mix 15 to compartments 7 and 8. FIG. 5 shows the device after paper washers 16 and wax seal 17 are applied to provide an airtight seal of the battery compartments.

After the battery compartments have been sealed, the electrical elements may then be incorporated into the device, and the remaining steps carried out. First, as shown in FIG. 6, contacts 9 and 10 are formed into their final shape; then lamp assembly 18, consisting of lamp 19 and reflector 20, is inserted into the casing 1 against shoulder 21. The lamp assembly may be a separate subassembly made by a light press fit of lamp flange 22 into collar 23 of reflector 20. After insertion, center contact 24 of lamp 19 is permanently connected to contact 10 at nipple 25. Switch 26 operates, by lateral sliding, to engage end 27 of contact 9 with lamp shell 28 of lamp 19, thereby completing the circuit and activating the lamp. After lamp assembly 18 is inserted, finally, lens assembly 29 is inserted to form a tight press fit with casing 1 at wall 30. Preferably the flashlight device is then sealed to prevent disassembly, and it is possible, if desired, to form a waterproof seal at the lens and switch by conventional methods.

FIG. 7 and 8 show an alternative casing made of two parts to facilitate the application of the various overlays. The casing, consisting of top 31, having center wall 32 and bottom 33, having sidewalls 34 and 35, is joined together after the various overlays are applied, as described above for casing 1, to the inner surfaces of walls 34 and 35 and to both surfaces of center wall 32, by inserting peripheral edge 36 and center-wall edge 37 of the top and center wall into recessed peripheral groove 38 and center groove 39 respectively, with suitable adhesive means not shown, for example by ultrasonic sealing.

FIGS 9 and 10 illustrate an alternative sealing means for the battery compartments. This type of seal is preferred because it alleviates the buildup of byproduct gases, principally hydrogen, of the electric discharge of the battery. Preferably the sealing means, consisting of molded seal 40, having an aperture 41, and backing sheet 42, is composed of a plastic material permeable to hydrogen, in order to vent such gas through the backing sheet 42 and aperture 41, and substantially impermeable to water vapor, in order to retard drying of the battery mix, which would deactivate the battery. Such plastic materials include certain polyvinyl chlorides; low density polyethylenes, such as DYNH (Union Carbide); acrylate copolymers, such as DPD-6169; and acetate copolymers, such as DQD-1868. These materials are freely permeable to hydrogen and only slightly permeable to water vapor. The thickness of backing sheet 42 is about 0.002—0.008 inch, and the diameter of aperture may be about three-eighths inch. Preferably the backing sheet 42 is heat sealed to the back of molded seal 40, or alternatively the two may be molded together as a single molded seal, not shown.

FIGS. 11 and 12 illustrate an alternative battery cell arrangement in a casing having eight battery compartments. FIG. 11 shows the main casing 43, consisting of sidewalls 44 and 45, end wall 46 and center wall 47. FIG. 12 shows detail of a separator wall 49, provided with connector 50 for electrical contact between the opposite sides of the wall. The eight compartments 48a—h are formed by inserting eight separator walls 49, the connection being between tongue 51 of the separator walls and grooves 52a—h of the sidewalls 44 and 45 of casing 43, and between tongue 53a—h of center wall 47 and grooves 54 of the separator walls 49.

The coating of the surfaces of casing 43 with the various overlays is somewhat complicated by the presence of so many compartments. Initially, surface 46a of the end wall is coated with a zinc overlay and surface 46b, with a carbon overlay, and an electrical contact 55 is provided between these two end wall overlays. Then six separator walls 49, having a carbon overlay on one side and a zinc overlay on the other, are inserted, in the locations between tongues 53b, c, d, f, g and h and grooves 52b, c, d, f, g and h, shown in FIG. 11, as above described. Finally, a separator wall 49, having a carbon overlay on its interior wall, is inserted between tongue 53a and groove 52a, and another separator wall 49, having a zinc overlay on its interior wall, is inserted between tongue 53e and groove 52e. Contacts (not shown) similar to contacts 9 and 10, used in casing 1 above, may then be connected to the connectors 50 of the last two separator walls 49 and to the lamp assembly in the conventional manner.

Figure 13:
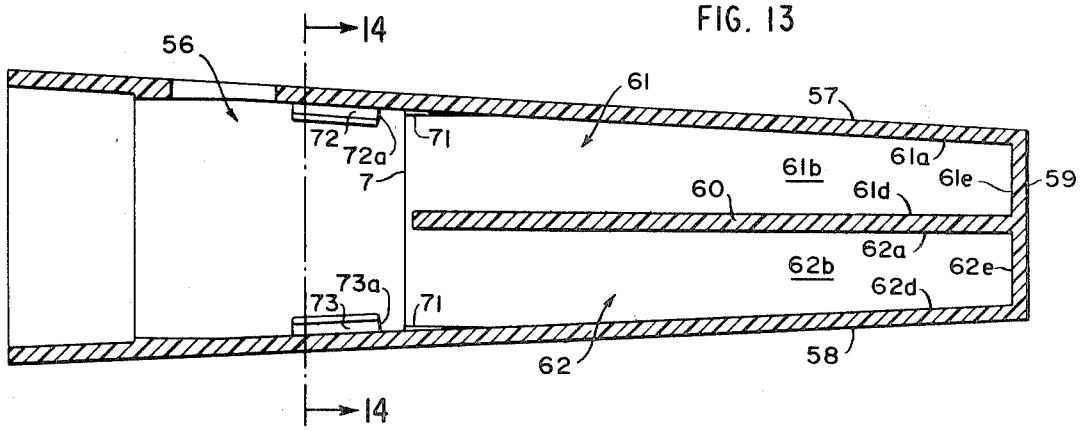
FIG. 13, a cross-sectional view showing in elevation another alternative case arrangement wherein the contacts need not extend into the battery compartments.
Figure 14:
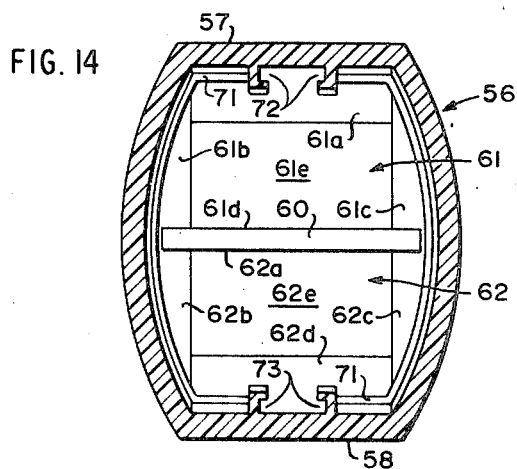
FIG. 14, a cross-sectional view along lines 14-14 of FIG. 13.

FIGS. 13—16 illustrate an alternative flashlight device, prepared by a method somewhat different from that used as illustrated in FIGS. 1—6. With reference to FIGS. 13 and 14, battery case 56 is provided with sidewalls 57 and 58, end wall 59 and center wall 60, and contains two battery compartments, 61 and 62. In the forward part of the case, ahead of the battery compartments, are recessed tracks 72 and 73, for the insertion of contacts. The battery compartments have wall surfaces 61a—e and 62a—e.

Figure 15:
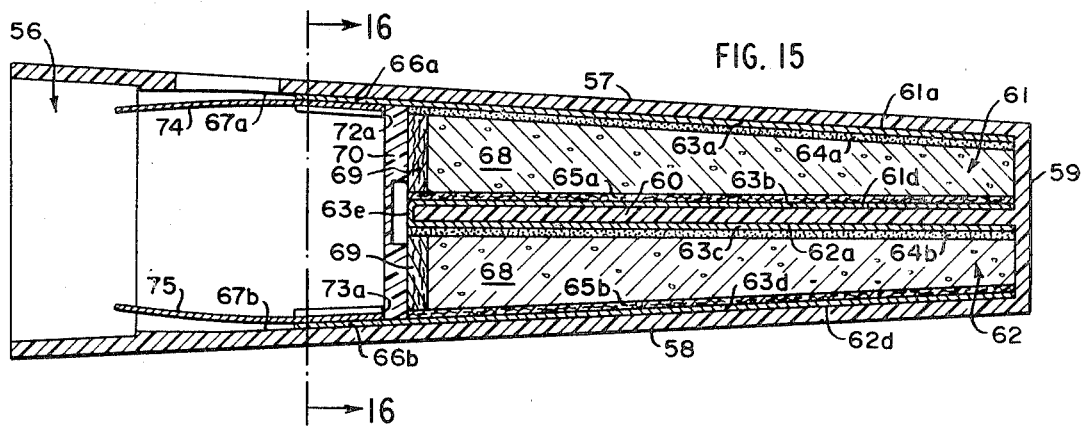
FIG. 15, a cross-sectional view of the case of FIGS. 13 and 14, after the zinc and carbon electrode overlays have been applied, after the paper barriers and battery mix have been inserted, after the sealing means of FIGS. 9 and 10 has been inserted, and after contacts have been inserted.
Figure 16:
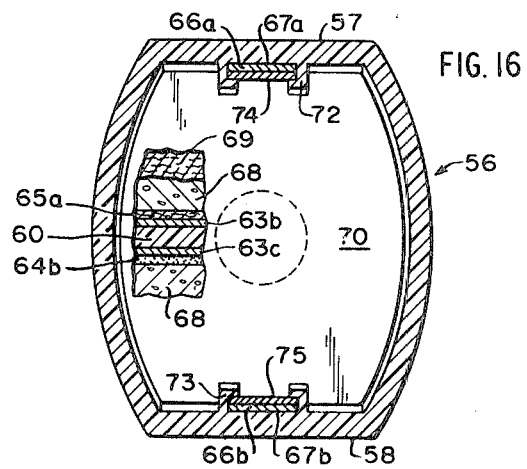
FIG. 16, a cross-sectional view, partially broken away, along lines 16-16 of FIG. 15.

FIGS. 15 and 16 illustrate the battery case 56 of FIGS. 13 and 14, after the battery compartments have been filled and sealed and contacts inserted, but before the electrical elements have been incorporated. The method is first to coat surfaces 61a, 61d, 62a and 62d with an electrode, such as zinc by the manner above described, to form overlays 63a—d; to coat zinc overlays 63a and c with the second electrode, carbon, to form overlays 64a and b; and to cover the remaining zinc overlays 63b and d with paper barriers 65a and b. Connection between battery compartments 61 and 62 is again provided by extending the zinc overlay 63e between overlays 63b and c. In addition, the application of zinc overlay is extended beyond the battery compartments into the forward part of the case by conducting overlays 66a and b on forward surfaces 67a and b of case 56. With various overlays in place, battery mix 68 and washers 69 are added, and hydrogen-permeable sealing means 70 (similar or identical to that illustrated in FIGS. 9 and 10) is force-fitted against shoulder 71, and held in place in part by the ends 72a and 73a of recessed tracks 72 and 73. This sealing means 70 provides a seal for the battery compartments that is permeable to hydrogen and substantially impermeable to water vapor. After sealing of the battery compartments, contacts 74 and 75 are inserted into recessed tracks 72 and 73, in intimate conducting contact with overlays 66a and b, respectively. The electrical components of the device, i.e. the switch, lamp and lens assembly, not shown, may be subsequently inserted in a manner similar to that used for the device earlier described.

It is apparent that in the device just illustrated in FIGS. 13—16 zinc overlays are applied directly onto the outer walls and extended beyond the battery compartments into the vicinity of the operative electrical elements, and contact made there between the elements and the zinc overlay. This arrangement may be preferred, especially where an effective seal may be difficult to maintain due to the extension of the contacts into the battery compartments. In any case, this latter procedure should be deemed equivalent to the procedure of inserting contacts into the battery compartments shown in FIGS. 1—6.

It will be evident that devices other than flashlights, or flashlights of different construction, may be similarly prepared in accordance with the present invention, perhaps if desired by altering the dimensions and shape of the case, and by employing suitably different operative electrical components.

A number of variations of the above devices are possible, still within the present. As sometimes desired with batteries, it is possible to provide for the release of pressure due to the formation of gas during the battery discharge. This may be accomplished by substituting a gas-permeable, liquid-impermeable seal for the wax seal, as above described. It also may be accomplished by the use of inhibitors, as above described, or by employing an expansive seal, made for example of elastic material, in place of the customary seal. Alternatively, a conventional gas vent may be employed to avoid the problem of gas pressure buildup.

The above specification has described preferred embodiments of the invention, namely various two-cell and eight-cell disposable flashlights. There is no intention to limit the invention to the illustrated embodiments, which is applicable as well to others.

I claim:

1. A disposable electrical device, which comprises a strong, inert plastic casing having at least one battery compartment and a forward compartment containing operative electrical elements, a first electrode overlay on at least one wall surface of said battery compartment in intimate contact with said surface, a second electrode overlay on at least one other wall surface of said battery compartment in intimate contact with said other wall surface, separate from said first electrode overlay, a battery mix within said battery compartment, and electric connecting means between said first electrode overlay, said electrical elements and said second electrode overlay, whereby a potential difference is effected between said first and second electrode overlays to operate said electrical elements, and sealing means rendering said battery compartment substantially impermeable to water vapor.

2. The electrical device of claim 1, wherein said casing is constructed of molded, high-impact polystyrene.

3. The electrical device of claim 1, wherein said sealing means comprises a molded plastic seal permeable to hydrogen and substantially impermeable to water vapor.

4. The electrical device of claim 1, wherein said first electrode overlay is zinc, and said second electrode overlay comprises a carbon overlay.

5. The electrical device of claim 4, wherein zinc overlays are in intimate contact with at least two separate wall surfaces of said battery compartment and said second electrode overlay comprises a carbon overlay in intimate contact with one of said zinc overlays.

6. The electrical device of claim 4, wherein said electric connecting means comprises two contacts on recessed tracks extending from said battery compartment into said compartment containing operative electrical elements and in connection therewith.

7. The electrical device of claim 4, wherein said casing comprises at least two battery compartments, and electric connection between said compartments is provided by a zinc overlay.

8. The electrical device of claim 4, wherein said zinc overlay is extended beyond said battery compartment into said forward compartment of said casing, and electrical connection is there made with said operative electrical elements.

9. The electrical device of claim 1, wherein said casing is the external casing of a flashlight and said operative electrical elements comprise a switch, a light bulb and a lens assembly.

10. A disposable electrical device, which comprises a strong, inert plastic casing having at least one battery compartment and a forward compartment containing operative electrical elements; a first electrode overlay on at least one wall surface of said battery compartment in intimate contact with said surface; a second electrode overlay comprised of a conductive overlay on at least one other wall surface of said battery compartment and a dissimilar overlay on said conductive overlay in intimate contact therewith; said first and second electrode overlays being separate from each other; a battery mix within said battery compartment and electric connecting means between said first electrode overlay, said electrical elements and said conductive overlay, whereby a potential difference is effected between said first and second electrode overlays; a barrier between said first electrode overlay and said battery mix; and sealing means rendering said battery compartment substantially impermeable to water vapor.

11. The electrical device of claim 10, wherein said sealing means comprises a molded plastic seal permeable to hydrogen and substantially impermeable to water vapor.

12. The electrical device of claim 10, wherein said first electrode overlay and said conductive overlay are zinc, and said dissimilar overlay is carbon.

13. The electrical device of claim 12, wherein said casing comprises at least two battery compartments, and electric connection between said compartments is provided by a zinc overlay.

14. The electrical device of claim 12, wherein said zinc overlay is extended beyond said battery compartment into said forward compartment of said casing, and electrical connection is there made with said operative electrical elements.

15. The electrical device of claim 12, wherein said zinc overlays are each about 0.003—0.02 inch in thickness, and said carbon overlay is continuous and about 0.002—0.005 inch in thickness.

16. The electrical device of claim 10, wherein said barrier is a thin film comprising a gel or paste continuous and sealed at the edges of said first electrode overlay.

17. A disposable, battery-operated flashlight, which comprises a strong, inert plastic casing having at least one battery compartment and a forward compartment containing a switch, a light bulb and a lens assembly, a first electrode overlay on at least one wall surface of said battery compartment in intimate contact with said surface; a second electrode overlay comprised of a conductive overlay on at least one other wall surface of said battery compartment and a dissimilar overlay on said conductive overlay in intimate contact therewith; said first and second electrode overlays being separate from each other ; a battery mix within said battery compartment and electric connecting means between said first electrode overlay, said switch and light bulb and said conductive overlay, whereby a potential difference is effected between said first and second electrode overlay; a barrier between said first electrode overlay and said battery mix; and sealing means rendering said battery compartment substantially impermeable to water vapor.

18. The flashlight of claim 17, wherein said sealing means comprises a molded plastic seal permeable to hydrogen and substantially impermeable to water vapor.

19. The flashlight of claim 17, wherein said first electrode overlay and said conductive overlay are zinc, and said dissimilar overlay is carbon.

20. The flashlight of claim 19, wherein said casing comprises at least two battery compartments, and electric connection between said compartments is provided by a zinc overlay.

21. The flashlight of claim 19, wherein said zinc overlay is extended beyond said battery compartment into said forward compartment of said casing, and electrical connection is there made with said switch and said light bulb.

22. The flashlight of claim 19, wherein said zinc overlays are each about 0.003—0.02 inch in thickness, and said carbon overlay is continuous and about 0.002—0.005 inch in thickness.

23. The flashlight of claim 17, wherein said barrier is a thin film comprising a gel or paste continuous and sealed at the edges of said first electrode overlay.